Inventors
M. Grosbois
G. Billon
By Holcombe, Wetherill & Brisebois
Attorneys

Jan. 5, 1965 M. GROSBOIS ETAL 3,164,789

DUAL INDEPENDENT CHANNEL WAVE GUIDE SYSTEM INCORPORATING ROTATING JOINT

Filed Oct. 16, 1961 2 Sheets-Sheet 2

Inventors
M. Grosbois
G. Billon
By Holcombe Wetherill & Brisebois
Attorneys

United States Patent Office 3,164,789
Patented Jan. 5, 1965

3,164,789
DUAL INDEPENDENT CHANNEL WAVE GUIDE SYSTEM INCORPORATING ROTATING JOINT

Marcel Grosbois, Thieu par Mitry-Mary, Seine et Marne, and Guy Billon, Brunoy, France, assignors to Compagnie Francaise Thomson-Houston, Paris, France, a French body corporate Filed Oct. 16, 1961, Ser. No. 145,141
Claims priority, application France, Oct. 21, 1960, 841,796, Patent 1,277,416
1 Claim. (Cl. 333—6)

The present invention relates to a wave guide system incorporating rotating joints intended for the independent transmission of two waves of perpendicular planes of polarisation. In such a system the waves leave the terminal guide of the transmitter and enter the guide connected to the load device, these two guides being coaxial but having an orientation variable in time in relation to one another.

Similar systems are known in which a well known property of differential phase transformers are used, and according to which an incident wave of rectilinear polarisation undergoes a minimum phase delay if the electric field of said wave is contained in a certain plane, while it undergoes a maximum phase delay if its electric field is contained in a second plane perpendicular to the first, the second plane being called the active plane of the phase-transformer.

One of these systems is composed of two differential phase-transformers of quarter-wave plate, said phase-transformers being arranged, respectively, in first and second guides which are joined coaxially by a rotating joint. The active plane of each phase-transformer which merges with that of the plate should be orientated according to one of the bisectors of the angle formed by the planes of polarisation of the waves transmitted in the guides to be joined. In spite of its simplicity this system presents the drawback that it does not allow for the independent phase-transforming of the transmitted waves and the angular sequences of their plane of polarisation.

The present invention has for an object to provide a rotating-joint system which does not present the above-mentioned drawback.

In accordance with an essential characteristic, the system of the present invention comprises an intermediary circular guide containing a halfwave phase-transformer and connected by rotating joints to the terminal guide of the transmitter and to the guide of the load device. The active plane of the phase-transformer must be contained within one of the bisectors of the dihedral angle which is formed by the planes of polarisation of one of the waves in the terminal guide of the transmitter and in the guide connected to the load device.

Figure 1:
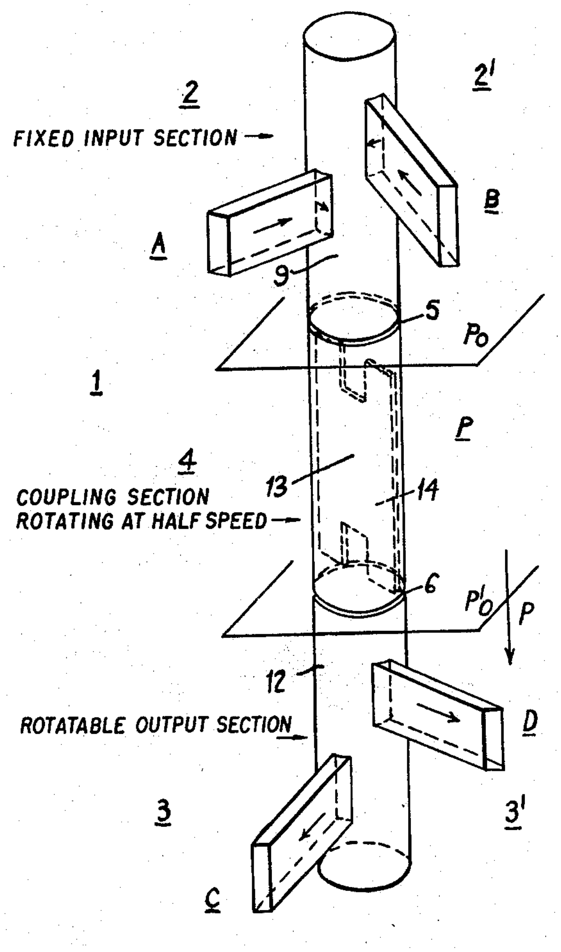
Figure 2:
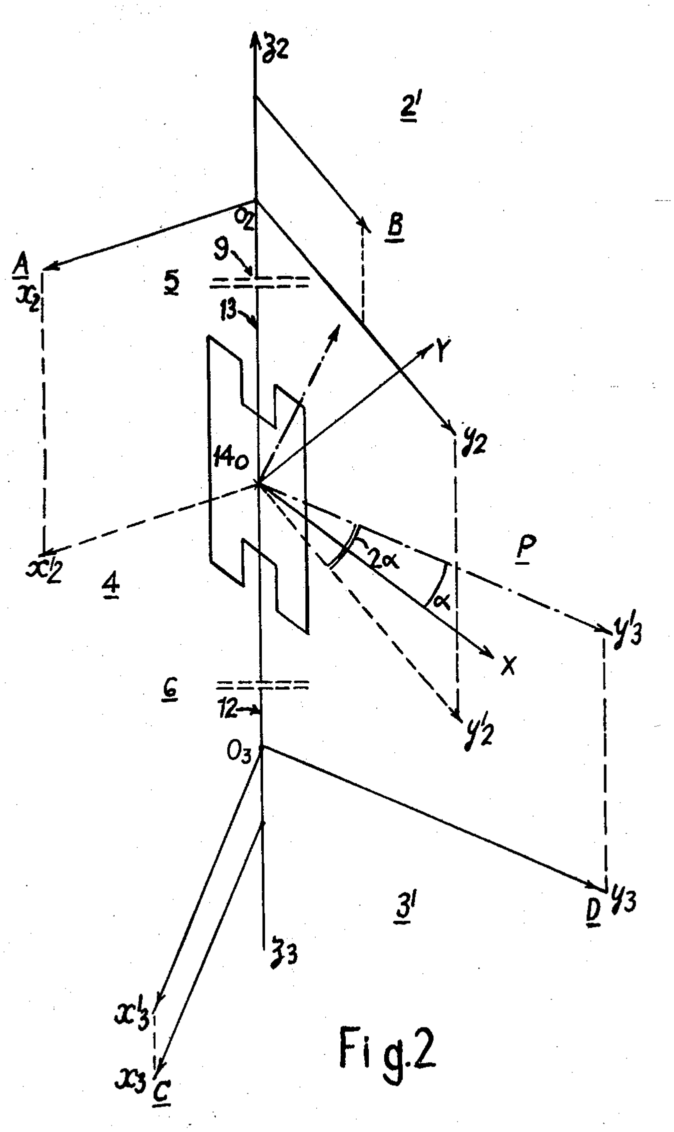

In order that the present invention may be more readily understood, reference will now be made, by way of example, to the accompanying drawings, in which:

FIGURE 1 illustrates one embodiment of wave guide system according to the present invention, and FIGURE 2 is a vectorial diagram for explaining the functioning of the system of FIGURE 1.

Referring to FIGURE 1 of the drawings, the wave guide system comprises a transmitter 2, of which only the junction device 2′ between three guides 9, A and B is shown, a load device 3, of which only the junction device 3′ between three guides 12, C and D is shown, and a phase-transformer 4 mounted in a length of circular guide 13 which is joined, respectively, to the circular cross-section guides 9 and 12 by two rotating joints 5 and 6.

The devices 2′ and 3′, which are identical, establish junctions between the circular cross-section guides 9 and 12 and two rectangular cross section guides A, B and C, D, respectively. The axes of each set of three guides are parallel to the axis of a trirectangular trihedron. One of the extremities of the circular cross-section guide (9 or 12) of each device 2′ or 3′ is generally closed. The junction devices used may, for example, be similar to those described in French Patent No. 1,188,267, filed December 12, 1957, and French patent application for "Junction Device Between Three Guides of Different Section" filed October 19, 1960, both of which are in the name of Compagnie Francaise Thomson-Houston.

The active element of the phase-transformer 4 is a half-wave plate 14 orientated along one of the bisectors of the dihedral of which the line is the axis of the circular guides and of which the rectilinear line is the angle formed by two straight lines parallel to the axes of the two rectangular cross-section guides coupled by the system (A and C or B and D).

The diagram of FIGURE 2 enables the functioning of the rotating joint system shown in FIGURE 1 to be clearly explained.

When a wave $a$ propagates in the guide A (Axis $O_2x_2$) it excites the formation of a wave $w$ in the interior of the guide 9, the plane of polarisation of this wave being $O_2y_2x_2$, which is identical to the plane $Oy'_2z_2$. When the wave $w$ has traversed the phase-transformer 4, the polarisation plane of the wave must be $O_3y_3z_3$, identical with the plane $Oy'_3z_3$, in order that this wave excites a wave $c$ in the guide C, no energy being transmitted in the guide D.

It is known, on the other hand, that if a half-wave phase-transforming plate identical to 14 forms an angle $\alpha$ with the plane of polarisation of an incident wave, the plane of polarisation of the wave transmitted by this phase-transformer is staggered at an angle to the angle $2\alpha$. The wave $w$ in the guide 12 will therefore have a plane of polarisation of satisfactory orientation if the phase-transforming plate 14 is orientated parallel to the bisector $Ox$ of the angle $y'_3Oy'_2$ or in other words, parallel to the bisector of the plane of polarisation of the wave $w$ in the guide 9 and to the desired polarisation plane of this wave in the guide 13.

It can be established that under the same conditions the incident energy in the guide 13 is integrally transmitted in the guide D.

In order to satisfy the condition relating to the orientations of the phase-transformer 4 of the terminal guide of the transmitter and of the guide connected to the load device 3, the phase-transformer must be actuated, with respect to the transmitter, at a rotation speed twice as small as that of the receiver.

In a system, analogus to that described, the entry guides A and B may be coupled, respectively, to the guides C and D or, inversely, to the guides D and C. However, should it be desired that the transmission channels be strictly identical, guides A, C and B, D should be coupled.

The impedance matching of each of the elements of the system of FIGURE 1, the junction devices 2′ and 3′ as well as the phase-transformer device, should be carried out separately.

In a rotating joint system constructed by the applicants, the impedance matching and a decoupling of 40 db between channels are conserved within bandwidth F/30, F being the average functioning frequency. The power associated with each of the waves transmitted can have a crest value of 200 kw. in band X, and 1 mw. in band S.

Such a system can be used separately to feed two rotatable antennae.

It will be understood that the channels A, B, C, D of the system shown in FIGURE 1 need not necessarily comprise rectangular cross-section guides. For example, coaxial lines may be used. The access channels (A–B and C–D) to the same junction device are not obligatorily identical, while the channels A and C are equipped with rectangular cross-section wave guides, the channels B, D may, for example, comprise coaxial lines.

In each junction device one of the channels can have the same axis as the circular guide.

Finally, it is possible to use junction devices which are not identical.

It is obvious that the half-wave phase-transformer 4 can be of any suitable kind.

We claim:

A wave guide system comprising a circular emitting guide, two input guides connected to said circular emitting guide, a circular load guide, two output guides connected to said circular load guide, said circular emitting and load guides being coaxial, an intermediate circular guide coaxial with said emitting and load guides, rotatable joints respectively connecting said emitting and load guides to said intermediate guide to enable said load guide to rotate relative to said emitting guide, said wave guide system being adapted to be fed through said input guides with two waves having planes of polarisation perpendicular to one another and said waves propagating from the emitting guide to the load guide through said intermediate guide, and a half-wave plate disposed within said intermediate guide whereby both waves are transmitted independently and unaltered, said intermediate circular guide having means to rotate it at half the speed of the load guide.

References Cited in the file of this patent

UNITED STATES PATENTS

| | | |
|---|---|---|
| 2,713,151 | Farr | July 12, 1955 |
| 2,759,099 | Olive | Aug. 14, 1956 |
| 2,858,512 | Barnett | Oct. 28, 1958 |
| 2,897,457 | Marie | July 28, 1959 |

OTHER REFERENCES

Ragan: Microwave Transmission Circuits, vol. 9 of Radiation Laboratory Series, McGraw-Hill, 1948, pages 430 to 432 cited.